United States Patent [19]

Greer

[11] Patent Number: 5,311,897
[45] Date of Patent: May 17, 1994

[54] ROTARY CONTROL VALVE WITH OFFSET VARIABLE AREA ORIFICE AND BYPASS

[75] Inventor: Cecil B. Greer, Longview, Tex.

[73] Assignees: Robert L. Cargill, Jr., Longview; J.J. Letesh Royalty Trust, Houston; H.M.G. Trust, Longview, all of Tex.

[21] Appl. No.: 947,713

[22] Filed: Sep. 18, 1992

[51] Int. Cl.$^5$ .......................... F16L 55/18; F16K 5/10
[52] U.S. Cl. .................... 137/15; 137/625.32; 251/209; 251/367
[58] Field of Search ............. 251/367, 208, 209, 117; 137/15, 315, 625.31, 625.32, 625.33, 599, 601

[56] References Cited

U.S. PATENT DOCUMENTS

| | | | |
|---|---|---|---|
| 3,443,793 | 5/1969 | Hulsey | 251/209 |
| 3,558,100 | 1/1971 | Hulsey | 251/209 |
| 3,612,102 | 10/1971 | Hulsey | 251/209 |
| 4,212,321 | 7/1980 | Hulsey | 251/209 |
| 4,881,718 | 11/1989 | Champagne | 251/209 |

Primary Examiner—A. Michael Chambers
Attorney, Agent, or Firm—Gunn & Kuffner

[57] ABSTRACT

A rotary control valve is provided with a variable area orifice in the control element that communicates with a bypass channel, which contains noise silencing means, when the valve is in the less than full-open position. This arrangement minimizes cavitation and noise when the valve is not in the full-open position while providing maximum flow with minimum friction and pressure drop when the valve is in the full-open position. The removable bypass channel configured with a single variable orifice in the control element allows for in-line maintenance of, or modification to, either the noise silencing means in the removable bypass channel or the valve body itself through top entry to the valve. The cross-sectional void area of the upstream and downstream ports as a means of further reducing noise and controlling velocities. The silencing means located within the bypass channel can be a multiplicity of balls or other such means that can be placed within the bypass channel. The through bore and the elongated variable orifice slot may be constructed latitudinally from any point below or above the equator of the control element. In addition, the bypass channel housing may be constructed, in whole or part, of a translucent material. The bypass channel housing may also have a separate, normally closed access to the channel for modification to, or maintenance of, the bypass channel or the noise suppression means contained therein.

19 Claims, 3 Drawing Sheets

ROTARY CONTROL VALVE WITH OFFSET VARIABLE AREA ORIFICE AND BYPASS

BACKGROUND OF THE DISCLOSURE

The present invention relates to a rotary control valve with a variable area orifice that communicates with a bypass channel when the valve is in the less than full-open position. This arrangement effectively eliminates cavitation and noise in the valve when not in the full-open position. More specifically, the invention relates to a rotary control valve with a variable area orifice in the control element that communicates with a bypass channel in the less than full-open position. Variable area rotary control valves are already widely used in the petroleum refining and chemical industries. Several types of these valves with rotary control elements have been patented, including the following patents:

U.S. Pat. No. 3,443,793
U.S. Pat. No. 3,558,100
U.S. Pat. No. 3,612,102
U.S. Pat. No. 4,212,321 (the "Hulsey 321 Patent").

The present invention may be described as an improvement over the present state-of-the-art valves which are used to control flow velocity and pressure drop of fluids or gases through various flow conduits. The current state of the art technology uses rotary-type valves, which, when rotated through predetermined degrees of rotations, provide a controlled variation of the flow path from the full open position to the complete shut-off position. The full-open position provides maximum flow with variable flow decreasing to the complete shut-off position.

In addition to controlling the flow characteristics (i.e., velocity and pressure), the rotary valves currently used often contain a noise-reduction means to suppress the noise inherently created with the restriction of the high velocity flow of fluids and gases through a rotary control valve. These noise suppression means in the prior art consist primarily of diverting the through-flow through a labyrinth of multiple flow-ways creating a tortuous flow-path that therefrom creates a restricted flow coupled with a dissipation of energy, resulting in substantially reduced noise levels.

The Hulsey '321 patent provides such a means to vary a flow path using two opposed divergent spiral grooves, one of which is in register with the upstream port and the other of which is in register with the downstream port. When the spiral grooves are rotated in the flow-path, flow is diverted into a tortuous path thereby creating a controlled restriction of flow and noise suppression. When the flow-control means in the Hulsey '321 patent is in the full-open position, the valve provides a non-restricted flow-path. The Hulsey '321 patent also describes a valve whereby noise is further reduced by placing other noise-silencing means within the flow-control member of the valve as well as within the two opposed divergent spiral grooves.

The noise suppression means described above present several difficulties. Primarily, the noise suppression means currently referred to in the prior art are subject to wear, erosion, and clogging. As such, valves employing these flow control and noise suppression means require substantial maintenance. Maintenance often times requires replacement of the control member or the noise-silencing means. At a minimum, because the design of the rotary valves described in the prior art precludes the design of a top-entry valve body, maintenance to such a valve requires that the valve be completely removed from the line, disassembled, retrimmed and then reinstalled at considerable expense.

SUMMARY OF THE INVENTION

I have now discovered that the variable area orifice rotary control valve can be improved by placing a single variable area orifice in a position away from the equator of the control element (typically latitudinally toward the south pole of the globe) which then communicates with a bypass channel when the control element is in the less than full-open position. The control member is rotatable within the valve housing. When in the full-open position, the valve provides a non-restricted flow-path through the control member by means of a through-bore. The through-bore will typically be the same diameter of the flow-ports in order to reduce any friction in the valve while in the full-open position. Two curved seals, which fit into the body of the valve, are placed at the exit of the upstream flow-port and the entrance to the downstream flow-port to further reduce friction and provide an adequate sealing means between the valve housing and the control member. When the valve is in the full-open position, the bypass channel communicates only nominally with the upstream port through a shallow shelf of the variable area orifice that extends through the through-bore of the control element. When the control element is rotated out of the full-open position, the variable area orifice feeds the bypass channel with variable flow which depends on the position of the control member. Typically, in order to maximize the noise-suppression and flow-control function of the bypass valve, the cross-sectional void area in the bypass channel will be the same as the cross-sectional area of the upstream and downstream flow-ports. This invention produces new and non-obvious results.

It is an objective of this invention to give a much greater turn ratio than is typically achieved in similar valves. By placing the upstream outlet of the through bore and the elongated variable orifice slot in a position latitudinally that is as close to the equator of the control element as possible, the turn ratio of the valve is increased significantly, thereby giving greater control of the flow through the valve. The turn ratio of the valve may be increased as to great as 1000:1.

It is an objective of this invention that the variable area orifice means provides a high range of flow rates. An advantage of this wider range of flow control is that it allows one valve to handle a wider range of applications. For example, a single six inch rotary valve of the preferred embodiment described below could be used to control the same flow range that would otherwise require a six inch conventional control valve in parallel with a four-inch control valve. Such a conventional dual valve installation requires a more complicated control arrangement, e.g., a split range transmitted arrangement for control or a manual selection of one valve or another depending on the desired flow range.

It is an objective of this invention to provide a tortuous path (which may contain additional noise suppression means and flow control means) that can be removed and replaced without removing the valve from service or disassembling the valve.

It is an objective of this invention to minimize the pressure drop and pipe friction through the valve when in the fully open position while minimizing the high pressure drop, noise, and cavitation problems associated with conventional rotary control valves in the less than full open position. This objective is further enhanced by providing a cross-sectional area of voids in the bypass channel that is the same as the cross-sectional area of the upstream and downstream ports. Pressure drop across the valve is minimized in the full-open position because the through bore of the control element is pipeline-sized and the flow is completely isolated from the tortuous path.

It is an objective of this invention to provide a tortuous path and specifically designed defusers within the tortuous path to keep velocities within reasonable limits and thereby absorb the pressure drop in stages, which would otherwise become a single point pressure drop across the valve. This also satisfies a further objective of the invention to provide a means of using low voltage electric analog and digital signals throughout the control loop without the use of additional, expensive equipment to transduce the signal at the control valve. The current state of the art requires transducing electronic control signals to pneumatics or hydraulics because of the large amount of torque required to control the valve through the less than full open position, which is created by the large pressure drop in that position. That method is both inefficient and expensive because it requires the cost of producing and maintaining instrument air, the engineering associated with the transducing function, and the extra capital expenditure for the pneumatic or hydraulic equipment at the valve.

It is an objective of this invention to provide a rotary control valve wherein the control valve stem and the control element can removed from the housing of the valve without removing the housing from its installation. This objective is accomplished through the placement of the upstream outlet of the through bore at a point below the equator of the control element so that a bonnet may be installed such that the seals between the control element and the upstream outlet of the control element are not destroyed during removal of the control element.

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
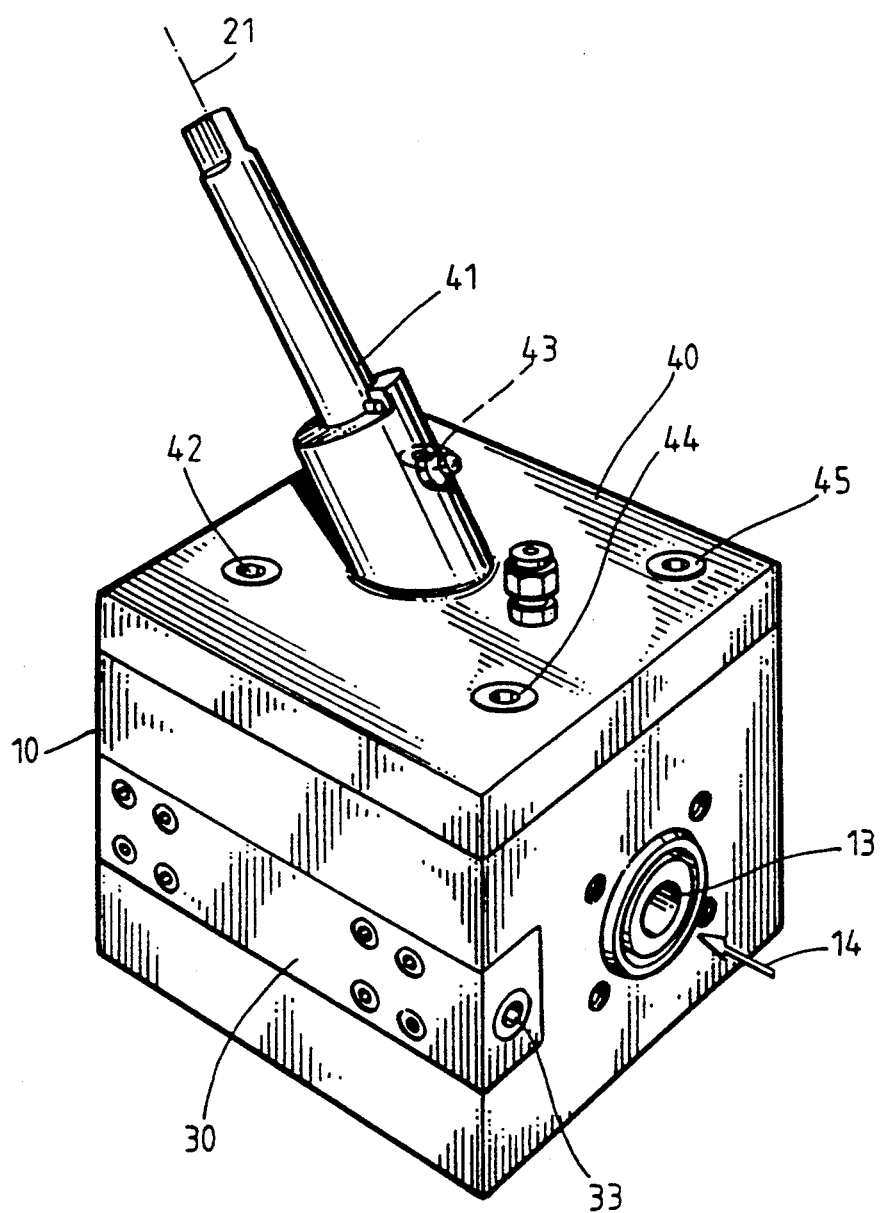
FIG. 1 is a view of a preferred embodiment of the rotary control valve with offset variable area orifice and bypass of the present invention.
Figure 2:
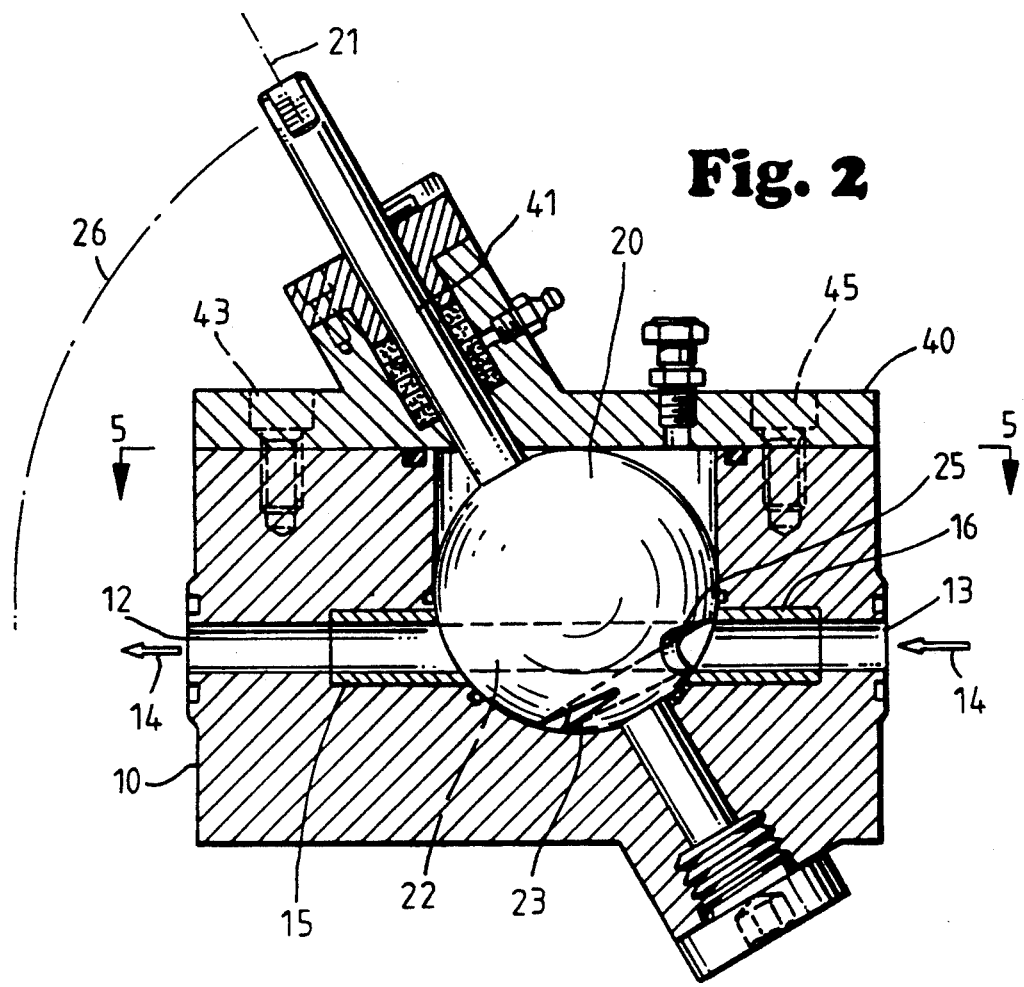
FIG. 2 is a cross-sectional side view of the rotary control valve of the present invention in the fully-open position.
Figure 3:
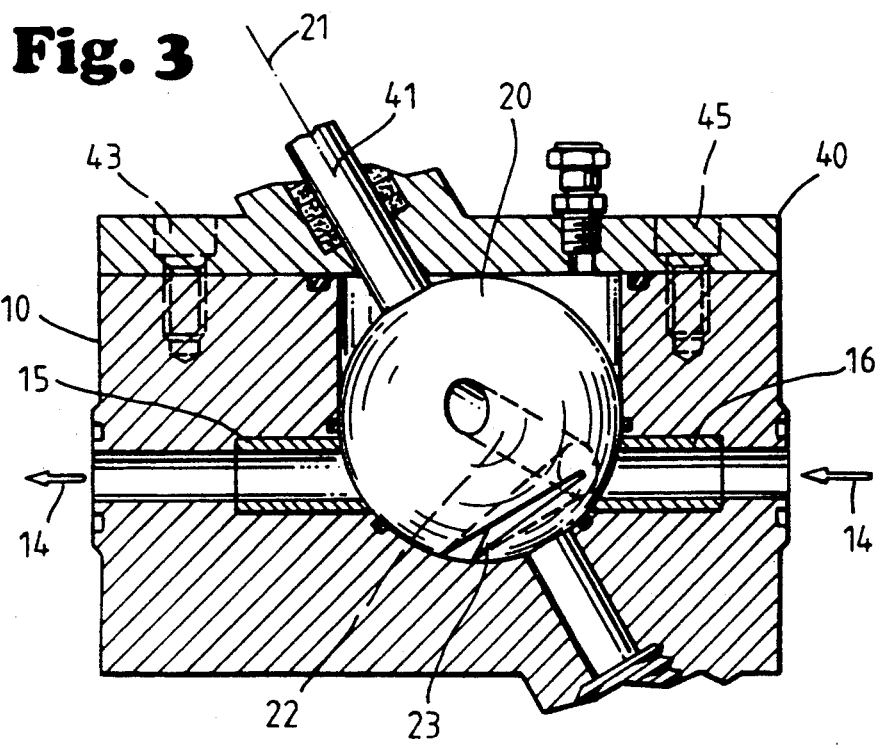
FIG. 3 is a cross-sectional side view of the rotary control valve of the present invention in the fully-closed position.
Figure 4:
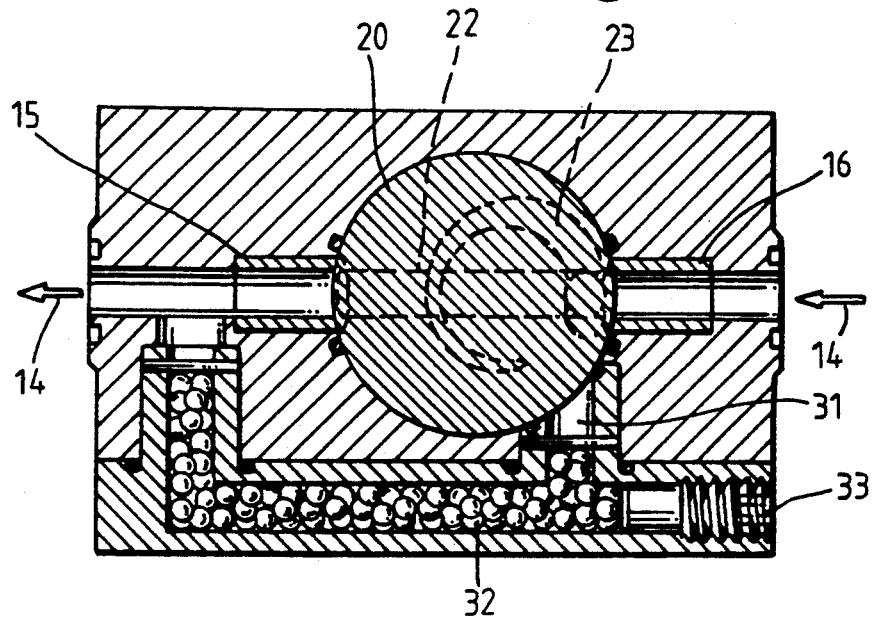
FIG. 4 is a cross-sectional top view of the rotary control valve of the present invention in the fully-open position.
Figure 5:
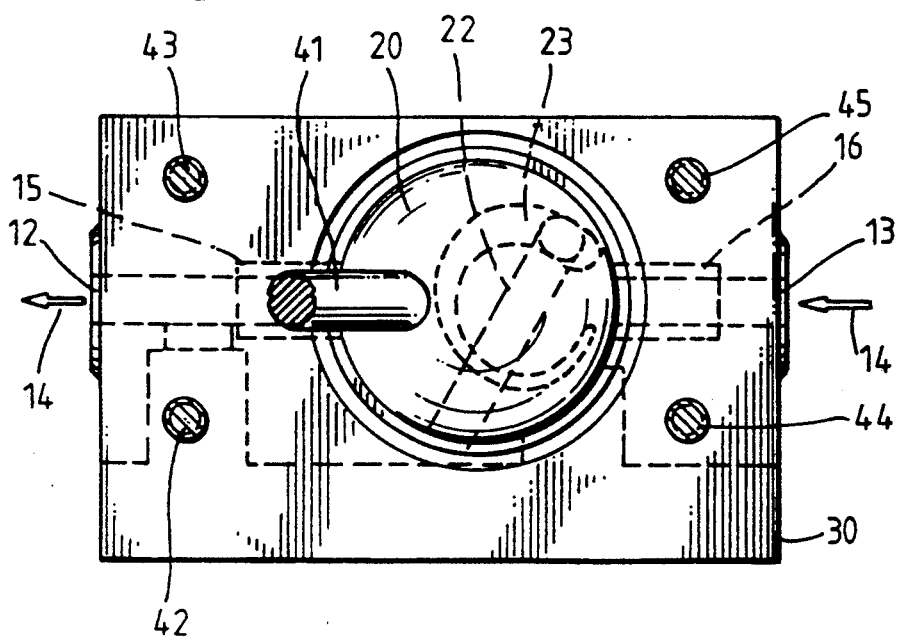
FIG. 5 is a top view of the rotary control valve in the fully-closed position.

As shown in FIG. 1 through FIG. 5, the preferred embodiment of the valve comprises a main housing (10) which defines a receptacle (11) having a main access. The receptacle (11) also has a pair of flow-ports (12) and 13) that define a flow-way 14. (See FIG. 2.) A control element body (or control member) (20) is shaped to fit inside the receptacle and has an axis of rotation (21) which is coaxial with the main axis of the housing. The control element body (20) has a through-bore (22). The control element through bore (22) will ordinarily have the same inner diameter as the upstream and downstream flow-ports (12 and 13). Extending from the upstream outlet of the through bore (22), an elongated variable orifice slot (23) extends circumferentially into the outer wall of the control element. The elongated variable orifice slot (23) is defined by walls converging towards the trailing end of the elongated orifice slot (23). The body of the control member (20) also has a non-slotted closure portion (24) between the trailing end of the orifice slot and the adjacent downstream outlet. The closure portion (24) is adapted to prevent flow through the valve from the upstream flow-port. The receptacle (11) is closed, and the control member (20) is held in place by a bonnet (40), which has a valve bore (41) and fixing means, which in FIG. 1 is shown as four threaded bolts (42 through 45).

Two curved seals (15 and 16) are typically seated in the main housing (10) to provide a seal between the two flow ports (12 and 13) and the non-slotted closure portion (24). In addition, the main housing (10) defines a receptacle (17) for a bypass channel housing (30) such that the flow from the upstream flow-port (12) to the variable orifice slot (23) in the control element body (20) would, in the less than full open position, flow through a bypass channel (31) and exit into the downstream flow-port (13). (See FIG. 3.) The bypass channel (31) may be defined within the bypass housing that fits within the main housing (11). The bypass channel has a tortuous path and baffling means (32) that, with the elongated orifice slot, provide a combined flow control function and a noise-suppression function.

In the preferred embodiment, the control element (20) is spherical. The silencing means located within the bypass channel can be a multiplicity of balls, a plurality of ribs, or other such means that can be placed within the bypass channel. (See FIG. 4.) Typically, the upstream outlet of the through bore and the elongated variable orifice slot are placed as close to the equator (25) of the spherical control element as practical. In addition, the control element is seated in the housing with the rotation axis (21) at an acute angle (26) to a line perpendicular to the flow-way (14) being controlled. Such an arrangement maximizes the turn ratio capabilities of the valve. In other embodiments, the upstream outlet of the through bore and the elongated variable orifice slot may be constructed latitudinally from any point below or above the equator of the control element to the above-described preferred position. (See FIG. 2 and FIG. 3.) In such embodiments, the acute angle of the rotational axis (26) of the control element body (20) will change such that the upstream outlet of the through bore (22) (in the full-open position) and the elongated orifice slot (23) communicate with the upstream flow-way.

In addition, an embodiment may contain a bypass channel housing constructed, in who or part, of a translucent or transparent material in order to monitor the need for maintenance. This same bypass channel housing may also have a separate, normally closed access (33) to the bypass channel for modification to, or maintenance of the bypass channel or the noise suppression means contained therein.

While the foregoing is directed to the preferred embodiment of the present invention, other and further embodiments of the invention may be devised without departing from the basic scope thereof, and the scope thereof is determined by the claims which follow.

I claim:

1. A method of controlling fluid flow and suppressing noise created in control, of the fluid flow comprising:
   (a) providing a rotary control valve having a main housing defining a receptacle having a mina axis, an upstream flow port and a downstream flow port communicating with the receptacle at spaced points to define a flow-way there-through disposed at an acute angle to the main axis, a bypass channel receptacle along the outer body of the main housing, upstream and downstream bypass channel ports communicating with the receptacle and the bypass channel receptacle to define a flow-way, and a stem port; a removable bypass channel housing that is shaped to fit the bypass channel receptacle defining a entrance port and an exit port communicating with the bypass channel receptacle ports and a bypass channel defining a flow-way; a silencing means disposed within the bypass channel housing; and a flow-control member rotatably disposed within the receptacle, the flow control member comprising:
      (i) a control member shaped to fit the receptacle and having an axis of rotation coaxial with the main axis;
      (ii) the control member defining an axial bore having an axis generally at an acute angle with respect to the axis of rotation, and the bore opening through the outer wall of the control member, whereby the opposite ends of the bore will be in register with the flow ports at the fully-open position of the control member;
      (iii) an elongated orifice slot through the wall of the control member extending latitudinal around the control member and tapering away from the upstream bypass channel port in the main housing, the slots being defined by walls converging toward their trailing ends;
      (iv) the control member having a non-slotted closure portion between the trailing end of the orifice slot and the adjacent end of the bore, the closure portion being adapted to close off the flow ports in the flow-way-closed position of the control member; and
      (v) a stem;
   (b) rotating the control member from the flow-way closed position until the elongated orifice slot permits flow of the desired amount of fluid from the upstream port to the tortuous path of the bypass channel; and
   (c) suppressing the noise and diffusing the pressure drop across the valve by passing the controlled fluid flow through the bypass channel and its silencing means.

2. The method as claimed in claim 1 wherein the control member is rotated to the full-open position and pipeline friction is minimized by passing the controlled fluid only through the through bore and not the bypass channel.

3. A method of providing maintenance to noise suppression means of a rotary control valve while still in-line in the full-closed position comprising:
   (a) providing a rotary control valve having a main housing defining a receptacle having a main axis, an upstream flow port and a downstream flow port communicating with the receptacle at spaced points to define a flow-way there-through disposed at an acute angle to the main axis, a bypass channel receptacle along the outer body of the main housing, upstream and downstream bypass channel ports communicating with the receptacle defining an entrance port an exit port communicating with the bypass channel receptacle ports and a bypass channel defining a flow-way; a silencing means disposed within the bypass channel housing; and a flow-control member rotatably disposed within the receptacle, the flow control member comprising:
      (i) a control member shaped to fit the receptacle an having an axis of rotation coaxial with the main axis;
      (ii) the control member defining an axial bore having an axis generally at an acute angle with respect to the axis of rotation, and the bore opening trough the outer wall of the control member, whereby the opposite ends of the bore will be in register with the flow ports at the fully-open position of the control member;
      (iii) an elongated orifice slot through the wall of the control member extending latitudinally around the control member and tapering away form the upstream bypass channel port in the main housing, the slots being defined by walls converging toward their trailing ends;
      (iv) the control member having a non-slotted closure portion between the trailing end of the orifice slot and the adjacent end of the bore, the closure portion begin adapted to close off the flow ports in the flow-way-closed position of the control member;
      (v) a stem;
   (b) rotating the control member from a flow-way open position until the elongated orifice slot no longer communicates with the upstream port of the main housing and is in the flow-way closed position;
   (c) removing the bypass channel housing from the main housing;
   (d) performing maintenance, or modification to, the noise suppression means and the bypass channel;
   (e) reinstalling the bypass channel housing into the main housing; and
   (f) rotating the control member from a flow-way closed position until the elongated orifice slot communicates with the upstream port of the main housing and is in the flow-way open position.

4. A rotary control valve comprising:
   (a) a main housing defining:
      (1) a receptacle having a main axis;
      (2) an upstream flow port and a downstream flow port communicating with the receptacle at spaced points to define a flow-way therethrough disposed at an acute angle to the main axis;

(3) a bypass channel receptacle along the outer body of the main housing;

(4) upstream and downstream bypass channel ports communicating with the receptacle and bypass channel receptacle to define a flow-way; and (5) a stem port;

(b) a removable bypass channel housing that is shaped to fit the bypass channel receptacle defining (1) an entrance port and an exit port communicating with the bypass channel receptacle ports; and (2) a bypass channel defining a flow-way;

(c) a silencing means disposed within the bypass channel housing; and (d) a flow-control member rotatably disposed within the receptacle, the flow control member comprising;

(1) a control member shaped to fit the receptacle and having an axis of rotation coaxial with the main axis;

(2) the control member defining an axial bore having an axis generally at an acute angle with respect to the axis of rotation, and the bore opening through the outer wall of the control member, whereby the opposite ends of the bore will be in register with the flow ports at a fully-open position of the control member;

(3) an elongated orifice slot through the wall of the control member extending latitudinal around the control member and tapering away from the upstream bypass channel port in the man housing, the slots being defined by walls converging toward their trailing ends;

(4) the control member having a non-slotted closure portion between the trailing end of the orifice slot and the adjacent ends of the bore, the closure portions being adapted to close off the flow ports in a flow-way-closed position of the control member; and (5) a stem.

5. The valve as claimed in claim 4 wherein the silencing means includes a multiplicity of balls.

6. The valve as claimed in claim 4 wherein the silencing means includes a plurality of angularly-spaced, radially and longitudinally extending ribs.

7. The valve as claimed in claim 6 wherein each of the ribs has one or more openings therein which are staggered to establish a convoluted, multi-path, fluid flow pattern between the ribs.

8. The valve as claimed in claim 4 wherein the bypass channel includes a disk or disk with a plurality of perforations.

9. The valve as claimed in claim 4 wherein the main housing provides a top entry to the valve such that maintenance may be performed on the valve while in-line.

10. The valve as claimed in claim 4 wherein the bypass channel housing is composed of flexible tubing.

11. The valve as claimed in claim 4 wherein the fluid flow through the flow-way is unhindered when the flow-way is not throttled by the tortuous bypass channel.

12. The valve as claimed in claim 4 wherein the elonga slot extends past the bore in a manner such that, when the bore is coaxial with the flow port, the extension of the slot is still communicating minimally with the bypass flow-way.

13. The valve as claimed in claim 4 wherein the bypass channel housing contains a spool having an inner tube and an outer tube forming there between a silencing chamber.

14. The valve as claimed in claim 13 wherein the wall of the inner tube is perforated.

15. The valve as claimed in claim 4 wherein the cross-sectional void area of the bypass channel is equal to the cross-sectional area of the upstream and downstream flow port of the receptacle.

16. The valve as claimed in claim 4 wherein specially formed seals are seated in the receptacle of the main housing at the upstream flow port and the downstream flow port of the receptacle.

17. The valve as claimed in claim 4 wherein the bypass channel housing defines a maintenance port which provide access to the bypass channel housing.

18. The valve as claimed in claim 4 wherein the bypass channel housing is comprised of translucent materials.

19. The valve as claimed in claim 4 wherein the bypass channel housing defines a view port that is filled with an inert, translucent material for viewing the bypass channel.

* * * * *